United States Patent [19]

Tsybulevski et al.

[11] Patent Number: 5,609,842
[45] Date of Patent: Mar. 11, 1997

[54] ZEOLITIC DESULFURING AGENTS AND THEIR APPLICATION IN THE PROCESSING OF GASSES CONTAINING NOTABLE $CO_2$ PROPORTIONS

[75] Inventors: Albert M. Tsybulevski; Vladimir I. Mourine, both of Moscow, Russian Federation; Dominique Plee, Pau; Francis Mayolet, Rambouillet, both of France

[73] Assignee: Vniigaz, Moscovskaia, Russian Federation

[21] Appl. No.: 290,957
[22] PCT Filed: Jul. 26, 1994
[86] PCT No.: PCT/FR94/00932
  § 371 Date: Nov. 22, 1994
  § 102(e) Date: Nov. 22, 1994
[87] PCT Pub. No.: WO96/03199
  PCT Pub. Date: Feb. 8, 1996
[51] Int. Cl.⁶ ....................................................... B01J 8/00
[52] U.S. Cl. .................. 423/244.11; 423/244.01; 95/136; 95/902; 502/64; 502/68
[58] Field of Search .................. 502/64, 68; 423/224.01, 423/244.11; 95/136, 902

[56] References Cited

U.S. PATENT DOCUMENTS 5,001,098  3/1991  Pacaud et al. ....................... 502/68

OTHER PUBLICATIONS

Kirk–Othmer *Encyclopedia of Chemical Technology*, 1979 (no month) vol. 6 pp. 195–196.
Hawley *The Condensed Chemical Dictionary* 1981 (no month) p. 777.

Primary Examiner—Michael Lewis
Assistant Examiner—Thomas G. Dunn, Jr.
Attorney, Agent, or Firm—Burns, Doane, Swecker & Mathis, L.L.P.

[57] ABSTRACT

It is now possible to desulfurize gases containing appreciable carbon dioxide proportions by limiting the production of carbon oxysulfide to a very low level, by treating these gases with adsorbents composed of very small, partially calcic zeolite A crystals agglomerated by clays containing low levels of iron and having reduced acidity and basicity. These clays may be obtained by phosphatization of montmorillonite, bentonite, attapulgite, or kaolin.

8 Claims, No Drawings

ZEOLITIC DESULFURING AGENTS AND THEIR APPLICATION IN THE PROCESSING OF GASSES CONTAINING NOTABLE CO₂ PROPORTIONS

The invention relates to processes for desulfurization of hydrocarbon gases and to zeolitic adsorbents that can be used in these processes. The invention may be applied in the oil, gas, and petrochemical industries and in petroleum refining.

Widespread use is made of adsorbents belonging to the category of type A and X molecular sieves, in order to purify gases containing sulfurated compounds. As described, for example, in Soviet Patent No. SU 753449, they have the advantage of possessing a good dynamic sulfur capacity and to lead to high purification rates. Nevertheless, when they are used in conjunction with crude, natural, or structurally similar gases having the composition:

$C_1$ 20 to 99% by volume $C_2$ 0 to 20%

$C_3$ 0 to 25%

$C_4$ 0 to 5%

$H_2$ 0.0001 to 0.15%

$CO_2$ 1 to 50% (preferably 1 to 15%) wherein $C_1$-$C_4$ are hydrocarbons of 1–4 carbon atoms the remainder being composed, for example, of $N_2$, $H_2$ He, they catalyze the reaction:

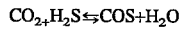

$CO_2 + H_2S \rightleftharpoons COS + H_2O$ and a large part of the $H_2S$ is transformed into carbon oxysulfide, which is not retained on the adsorbent and is found in the purified gases.

More precisely, in the case of gases containing more than 1% by volume of $CO_2$, e.g., 2%, and 0.1% of $H_2S$, a 5A sieve exchanged at 65–70% and granulated by means of a kaolinite binding agent generates some 140 to 220 mg/m³ of COS (see French Patent No. 2,618,085). To express this phenomenon in practical terms, the standard allowed on Russian soil is 35 to 40 mg/m³.

The present invention is intended to solve these problems and to supply adsorbents for desulfurization of high capacity gases, which at the same time are effective in removing $H_2S$ from the gases and have very limited COS-formation catalytic activity; and, more specifically, adsorbents endowed with a high dynamic adsorption capacity of approximately 2% by weight, but with which the level of COS formation remains limited to a maximum of 35 mg/m³.

According to the invention, this result is achieved by using CaA zeolite whose microcrystals have sizes ranging between approximately 1 and 2 μm, whose rate of $Ca^{2+}$ion exchange is between 76 and 90%, and preferably between 78 and 88%, and which is granulated using a natural mineral binding agent, e.g., bentonite, kaolinite, montmorillonite, attapulgite, etc., this binding agent being required to contain less than 0.5% iron (expressed in $Fe_2O_3$) and a phosphate content of 0 to 3 4%, expressed in added alumina phosphate, and to have an acidity (expressed in terms of adsorption of $NH_3$ at 150° C.) of less than 0.1 mmole/g, as well as a basicity (expressed n terms of adsorption of $SO_2$ adsorbable at 150° C.) of less than 0.15 mmole/gram.

Secondary porosity of the adsorbent is an important characteristic of the adsorbents according to the invention. To date, only diffusion in the zeolite microcrystals had been taken into account. The inventors revealed the substantial advantage to be gained by considering permeability as an additive property, defined by the equation $1/D_{gr}=1/D_z+1/D_{por.sec}$, where $D_{gr}$, $D_z$, and $D_{por.sec}$ are the coefficients of diffusion in the granulate, the microcrystals, and the secondary pores, respectively. They verified that, by increasing the volume of these secondary pores, and thus the total permeability of the granulates to the adsorbate, the contact time between the adsorbate and the adsorbent was reduced while improving the adsorption capacity. This is a new result, which is confirmed by example 7 below. This secondary porosity of the agglomerate is estimated based on the adsorption of hexane at 20° C. from 0.18° to 0.95° P/Ps), and is chosen so as to range preferably between 0.42 and 0.55 cm³/g for pore radii of between 10 and 500 Angstrom units ($10.10^{-10}$ m to $500.10^{-10}$ m). This secondary porosity is governed by the judicious choice of the conditions under which the agglomerated products are fabricated, i.e., parameters well known to the specialist, such as the choice of the binding agent, the moisture of the paste, the vis pressure of the mixer shaft, the cooking rate, the use of gas-forming additives by thermal decomposition during cooking, e.g., molasses, methylene blue, or surfactants, such as nonylphenol oxyethylenated at 40 OE, in quantities ranging from approximately 0.5 to 2.5%.

The $Ca^{++}/Na^+$ cation content of the adsorbents according to the invention has a direct effect on the catalytic activity of these products. To reduce COS formation, the $Na^+$ content of the zeolitic composition must be lowered to 1.4 milliequivalents/g, thereby corresponding to a $Ca^2/Na^+$ exchange rate of approximately 80%.

Very small size crystals may nevertheless undergo loss of structure because of a fairly advanced ion exchange, and during this stage they may develop new catalytic centers promoting COS formation. Accordingly, the high exchange rates required by the present invention may be achieved without compromising the crystalline structure, provided that only crystals whose size is restricted to a value of less than 1 μm are selected. Moreover, COS formation is reduced appreciably only when small crystals are used, probably because, in this case, the time during which the $CO_2$ remains in the microcrystals is reduced. In this way, the functional size of the microcrystals was limited to 1 to 2 μm.

Clays inevitably contain iron and aluminum oxides which play an active role in the COS-formation reaction. The $Fe^{2+}$ and $Fe_{3+}$ ions have a strong tendency to travel and to be exchanged within the solid with alkaline and alkaline-earth cations under the effect of temperature. Accordingly, adsorbents which are initially inactive as regards COS formation begin to produce COS after several thermal regeneration cycles, especially since water is formed or is present at high temperature. The invention solves this problem by utilizing only binding agents containing low proportions of uncombined iron (proportion of less than 0.5% expressed in $Fe_2O_3$). The inventors also proved that the COS-formation reaction takes place at the Bronsted basic sites. The gamma-alumina has appreciable acidity and basicity (acidity expressed in terms of adsorption of $NH_3$ of 1.4 to 1.8 mmole/g, and basicity expressed in terms of adsorption of $SO_2$ of from 0.8 to 1 mmole/g). These authors suggest deactivating the active sites in the clay by phosphatization, an operation which is simply carried out by mixing the clay with an aqueous solution of ortho- or methaphosphoric acid having the appropriate concentration. One example of the relationship between COS-formation activity and the basicity of the clay is given in Example 6.

The invention also concerns the use of adsorbents such as those described above in processes for purification of natural or similarly-structured gases having the composition specified above, said processes being carried out under pressures of from 0.1 to 10 MPa at temperatures of from 0° to 50° C. and at linear speeds of from 0.01 to 0.2 m/s.

EXAMPLES

The following examples will lead to a better understanding of the invention.

Example 1

Combined influence of crystal size and exchange rate

In this example, the binding agent was Engelhardt ASP 200 kaolin, whose $Fe_2O_3$ content was 0.5% and whose acidity was 0.32 mmole $NH_3$/g. Passivation was carried out by mixing with a mortar using 0.94% phosphoric acid at the rate of 9 grams kaolin per 1 gram of phosphoric solution, and by letting the mass mature for three hours at 65° C. in an oven. Its capacity for generating carbon oxysulfide was measured by the carbon oxysulfide-formation constant K(COS), equal to $6.10^{-6}$ mole.$kg^{-1}$.$s^{-1}$.$Pa^{-1}$.

Comparison was made between currently used industrial crystals measuring 1 to 10 µm having relative low exchange rates and crystals according to the invention measuring 1 to 2 µm and having a higher exchange rates and agglomerated with 20% binding agent, as regards their K(COS) constant expressed in $10^{-6}$ mole.$kg^{-1}$.$s^{-1}$.$Pa^{-1}$.

| Crystals | Industrial | According to Invention |
|---|---|---|
| Exchange rate | 72% | 77% |
| K(COS) | 12.2 | 9.5 |

These results reveal the decreased rate of COS formed using the adsorbents according to the invention.

Example 2

In this example, comparison was made between industrial-size crystals (1–10 µm) agglomerated with a binding agent, passivated or not as regards their COS-formation constant. The results obtained clearly favor agglomeration with the passivated binding agent.

| Crystals | Industrial | |
|---|---|---|
| Passivated binding agent | yes | no |
| Exchange rate | 72% | 72% |
| K(COS) | 6.2 | 12.2 |

Example 3

The adsorbent was prepared under the conditions in Example 1, without passivation, using industrial-size crystals (1–10 µm). The range of variation of the rates of cation exchange $Na^+ \rightarrow Ca^{2+}$ went from 60.5 to 97%. The activity of the granulated samples was estimated based on their carbon oxysulfide constant K(COS), expressed in $10^{-6}$ mole.$kg^{-1}$.$s^{-1}$.$Pa^{-1}$.

| Sample | A-0 | A-1 | A-2 | A-3 | A-4 | A-5 |
|---|---|---|---|---|---|---|
| Exchange rate (%) | 60.5 | 72 | 78 | 87 | 92 | 97 |
| K(COS) | 19.6 | 12.2 | 8.0 | 7.4 | 14.6 | 16.7 |

These results demonstrate that, to ensure that the K(COS) constant does not exceed 10, the exchange rate in the adsorbent must fall within the range of 76 to 90%. A rate of exchange of 78 to 88% is preferred, within which a constant of at most 8 is achieved.

Example 4

A series of adsorbents was prepared having a rate of exchange of 78% (the rate of sample A-2 in the preceding example), but microcrystal size was varied according to conventional specialist practice by adjusting the spontaneous appearance of seed crystals during gel maturation, or on their seeding by means of controlled quantities of seed crystals. For example, crystals measuring 1 to 2 µm were obtained in operation B-2 by ripening a gel having the composition 2 $Na_2O$—$Al_2O_3$-2 $SiO_2$-90 $H_2O$ for 20 hours at ambient temperature, followed by crystallization at 100° C. for three hours; the same procedure yielded a narrow size-graded distribution because of the fact that a large number of seed crystals formed during maturation. Similarly, the crystals in operation B-4 were obtained from a gel having the same composition, 2 $Na_2O$—$Al_2O_3$-2 $SiO_2$-90 $H_2O$, but which was seeded before crystallization with a sufficient quantity of seed crystals (finely-ground zeolite 4A), so that the size of the final crystals ranged from 3 to 4 µm.

The results are recorded in the table below. As before, the carbon oxysulfide constant K(COS) is expressed in ($10^{-6}$ mole.$kg^{-1}$.$s.^{-1}$.$Pa^{-1}$).

| Sample | A-2 | B-0 | B-2 | B-3 | B-4 | B-5 |
|---|---|---|---|---|---|---|
| Sizes (µm) | 1–10 | 0–2 | 1–2 | 2–4 | 3–4 | 4–6 |
| K(COS) | 8.0 | 12.2 | 3.1 | 8.6 | 8.4 | 21.9 |

These results reveal that a narrow distribution and small microcrystal size are preferable. Optimal size falls between 1 and 2 µm.

Example 5

A series of adsorbents based on sample B-2 in the preceding example was prepared by granulation of the zeolite powder using kaolin-containing clays drawn from various CEI deposits and characterized by varying iron contents. The clay content was set at 20% in all cases. The results appear in the following table, which presents both the content by weight % of the iron present as $Fe^{2+}$ and $Fe^{3+}$ in the clay and expressed in terms of $Fe_2O_3$% and the carbon oxysulfide-formation constant K(COS) expressed in $10^{-6}$ mole.$kg^{-1}$.$s.^{-1}$.$Pa.^{-1}$.

| Sample | C-0 | C-1 | C-2 | C-3 |
|---|---|---|---|---|
| $Fe_2O_3$ % in the clay | 0.1 | 0.44 | 1.2 | 3.9 |
| K(COS) | 2.6 | 3.2 | 10.2 | 33.0 |

Example 6

In this test, the variable investigated was the acidity-basicity according to Bronsted of the binding agent of the adsorbent. To this end, the series of samples D-1 to D-3 was prepared from sample C-1 in the preceding example. The binding agent was added to these samples at the rate of 5% by weight of the final product of $\gamma$-$Al_2O_3$ or $\eta$-$Al_2O_3$ having varying acidities and basicities. Acidity was measured by ammonia adsorption at 150° C., and basicity by sulfur dioxide adsorption at that same temperature. These values were measured using a McBain balance. To this end, the samples were first heated to 400° C. in a vacuum until reaching constant weight. Ammonia or sulfur dioxide adsorption was carried out at ambient temperature and under a pressure of 5–10 mm of mercury (0.6 to 1.3 kPa). The excess adsorbate was then drained off. The sample thus treated was then heated to 150° C. in a vacuum for one hour. The recorded loss of weight expressed in millimoles of ammonia or sulfur dioxide per gram of adsorbate measured acidity or basicity. The results are given in the table below.

| Sample | C-1 | D-1 | D-2 | D-3 |
|---|---|---|---|---|
| Acidity $NH_3$ (mmole/g) | 0.35 | 0.11 | 0.46 | 1.1 |
| Basicity $SO_2$ (mmole/g) | 0.28 | 0.08 | 0.15 | 0.78 |
| K(COS) | 3.2 | 1.8 | 2.9 | 55.0 |

Example 7

Five kilograms of each of various samples were loaded into pilot equipment whose adsorber had a diameter of 50 mm and in which the height of the adsorbent bed was approximately 3 m. The incoming natural gas contained 2% CO2, 1.1% ethane, 0.03% propane, and 0.08% $H_2S$, the remainder being methane. The dew point was −55° C. at normal pressure. The flow rate was 18 m3/h, the pressure was 55 bars, and the temperature, 40° C. For this test the following were prepared in larger quantities:

sample A-2 similar to that in Example 3;

sample B-2 similar to that in Example 4;

sample C-1 similar to that in example 5;

samples E-1, E-2, and E-3 having variable secondary porosity prepared from 88% exchanged crystals and a passivated binding agent, as explained in Example 1, the variation of pore volume being obtained by adding to the binding agent variable quantities of a molasses or methylene blue solution as the pore-forming agent.

As a comparison, a test was conducted with a sample A, which is a product according to prior art (French Patent No. 2,277,798).

The characteristic measured was the COS and $H_2S$ content of the outflowing gases.

| Samples | A | A-2 | B-2 | C-1 | E-1 | E-2 | E-3 |
|---|---|---|---|---|---|---|---|
| Crystals (μm) | 1–10 | 1–10 | 1–2 | 1–2 | 1–2 | 1–2 | 1–2 |
| Exchange rate | 72 | 78 | 78 | 78 | 88 | 88 | 88 |
| $Fe_2O_3$ % | 0.81 | 0.81 | 0.81 | 0.44 | 0.44 | 0.5 | 0.5 |
| Basicity (mmole/g) | 0.21 | 0.21 | 0.21 | 0.28 | 0.09 | 0.11 | 0.11 |
| Pores (cm³/g) | 0.26 | 0.26 | 0.36 | 0.41 | 0.55 | 0.49 | 0.44 |
| $H_2S$ capacity, % | 2.2 | 1.8 | 2.35 | 2.3 | 3.1 | 2.8 | 2.7 |
| Outflow of COS mg/m³ | 215 | 175 | 165 | 58 | 18 | 26 | 30 |

These results confirm the relevance of the choice of the adsorbent parameters as regards the capacity for adsorption of $H_2S$ and the minimization of the proportion of outflowing COS.

We claim:

1. Synthetic CaA zeolite-based adsorbent for the desulfurization of gases containing more than 1% $CO_2$, comprising
   from 75 to 85% by weight of a type A zeolite whose microcrystal size is 1 to 2 μm and whose rate of exchange by $Ca^{2+}$ ions is between 76 and 90%;
   from 15 to 25% by weight of a clay containing less than 0.5% by weight of iron expressed as $Fe_2O_3$, whose acidity, expressed in ammonia adsorbable at 150° C., is less than 0.1 mmole/g and whose basicity, expressed in sulfur dioxide adsorbable at 150° C., is less than 0.15 mmole/g; and
secondary pores which occupy between 0.42 and 0.55 cm³ per gram of the adsorbent.

2. Adsorbent according to claim 1, wherein the radii of the secondary pores range between 10 and 500 Å.

3. Adsorbent according to claim 1, wherein the clay is selected from the group consisting of montmorillonite, bentonite, attapulgite, and kaoline, and wherein the clay is modified by treatment with phosphoric acid such that it contains 0.2 to 3% by weight of aluminum phosphate.

4. The adsorbent of claim 1, wherein the rate of exchange by $Ca^{2+}$ ions is between 78 and 88%.

5. A method for desulfurization of gases comprising loading the adsorbent of claim 1 as a bed in an adsorber, passing the gases to be purified into the adsorber such that the gases come into contact with the adsorbent, and collecting the desulfurized gases from the adsorber, wherein the gases to be desulfurized comprise:

$C_1$ 20 to 99% by volume $C_2$ 0 to 20%

$C_3$ 0 to 25%

$C_4$ 0 to 5%

$H_2S$ 0.0001 to 0.15%

$CO_2$ 1 to 50% wherein $C_1$–$C_4$ are hydrocarbons of 1–4 carbon atoms.

6. The method of claim 5 wherein the gases are desulfurized under the following conditions:

Pressure: 0.1 to 10 MPa

Temperature: 0° to 50° C.

Linear speed: 0.01 to 0.2 m/s.

7. The method of claim 5, wherein the gas to be desulfurized comprises 1 to 15 % $CO_2$ by volume.

8. The method of claim 5, wherein the gas to be purified further comprises $N_2$, $H_2$, and He.

* * * * *